Aug. 10, 1954 R. G. WADDELL 2,685,907
TUBELESS TRUCK TIRE RIM AND VALVE
Filed April 21, 1953
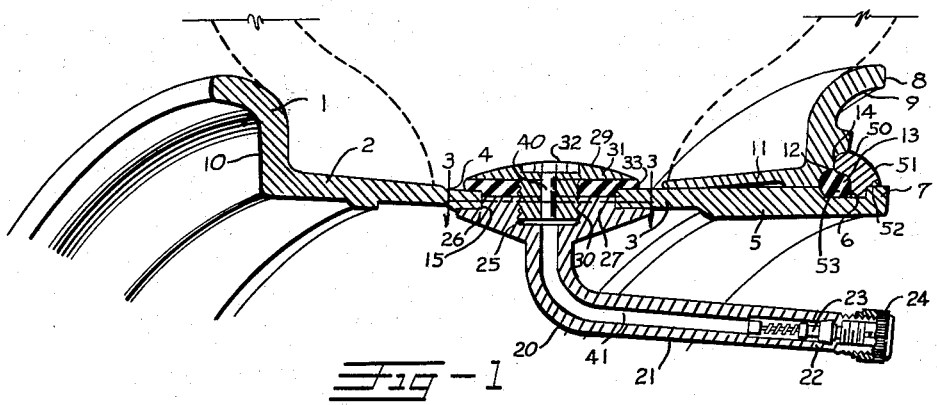
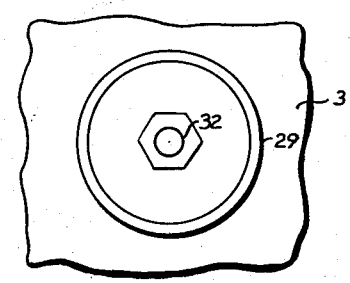
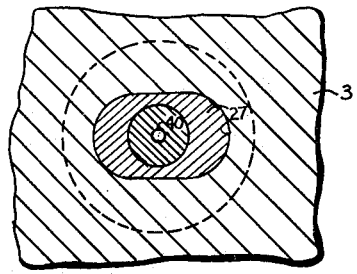
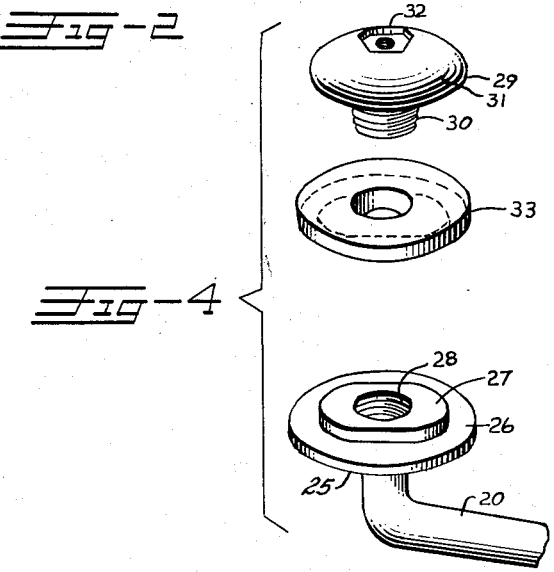
INVENTOR.
Robert G Waddell
BY
W. A. Fraser Patented Aug. 10, 1954

2,685,907

UNITED STATES PATENT OFFICE 2,685,907

TUBELESS TRUCK TIRE RIM AND VALVE

Robert G. Waddell, Akron, Ohio, assignor to The Firestone Tire & Rubber Company, Akron, Ohio, a corporation of Ohio Application April 21, 1953, Serial No. 350,008

3 Claims. (Cl. 152—427)

The present invention relates to valves for inflating tubeless tires, and it is particularly adapted for valves of the type which are removably attached to truck tire rims.

A tubeless truck tire of the type that requires the introduction of tire inflationary fluid through the tire rim has heretofore presented a serious problem in getting the required fluid tight seal between the valve stem and the rim. One expedient has been to permanently attach the valve stem to the rim base as by welding or any other means found satisfactory. Permanent attachment of the valve stem to the rim simplifies the problem of obtaining an air-tight seal between the valve stem and the rim, but such constructions are not entirely satisfactory due to the fact that valve stems frequently become injured, and if the stem has been permanently attached to the rim, its replacement is frequently complicated. Means for removing a permanently attached valve stem from the rim and replacing it, generally is not readily available to the user of the tire. Another expedient has been to use a valve stem of the type now in common use for tire inner tubes and provide a rubbery washer about the stem between the tire rim and the valve base, the rubbery washer being so disposed that it seals the rim valve hole about the valve stem. This latter expedient of using the rubbery washer has the advantage of making it convenient to remove and replace an injured valve stem, and presently is the most generally used means of attaching the valve stem to tubeless tire rims. Truck tire valve stems are often of considerable length, having a first extent from the base of the valve a distance to pass through the valve hole in the rim and then a second and longer extent laterally of the rim, in order that the end of the stem, which houses the valve core, may be exposed and available for inflating the tire, by the application of the usual service station air chuck to the intake end of the valve stem. This disposition of the valve stem exposes it in service to contact with stones, sides of ruts and to various objects which sometimes causes the valve stem to be turned from its original position. Such turning frequently destroys the seal between the rubbery washer and rim at the valve hole resulting in a slow leak and deflation of the tire.

It is an object of the present invention to provide means which prevent the turning of such angular valve when it is removably attached to a tire rim.

Another object of the invention is to provide a valve stem and rim assembly for a tubeless tire, which stem is removably associated with the rim base in fluid tight nonrotatable relation therewith.

Referring to the drawing:

Fig. 1 is a fragmentary perspective view, partly in section, of a valve rim and tubeless tire assembly embodying the present invention, with only the bead portions of said tire being shown in dash lines illustrating said portions positioned in the assembly relative to the rim and valve;

Fig. 2 is a fragmentary top plan view of the valve portion of the assembly shown in Fig. 1;

Fig. 3 is a sectional view taken on line 3—3 of Fig. 1 illustrating the shape of the valve hole in the rim base and the complementary shape of the portion of the valve stem adapted to enter said hole; and Fig. 4 is an exploded perspective figure illustrating the elements of the valve stem and the washer which are disposed adjacent the valve base when the rim and the valve stem are assembled in operative position.

Referring now to the drawings in more detail, it will be seen, by reference to Figure 1, that the invention comprises a rim referred to generally as 10. Rim 10 includes an endless side flange 1, a tapered tire bead seat 2 which merges into a rim base 3 by a radially inwardly sloped step-off 4. Base 3, opposite flange 1, has a thickened portion 5, a continuous radially outwardly facing gutter 6, and a continuous radially outwardly extending edge portion 7. An endless removable side flange 8 is mounted on base 3 in laterally slidable relation therewith. Side flange 8 comprises a tire side flange portion 9 and a tapered tire bead seat 11, said seat 11 extending laterally inwardly of flange 9 a distance sufficient to substantially underlie the entire bead base of a tire with which it is to be used, the tire beads being indicated in dotted lines. A continuous groove 12 is disposed at the radially inner and lateral outer corner of flange 8 and is adapted to contact a portion of a rubber or rubber-like sealing ring 13 as will be understood as the description continues. Adjacent and radially outward of groove 12 is a circumferentially extending continuous radially outwardly sloped beveled portion 14 adapted to receive and radially overlie a tip portion 50 of a lock ring 51 as will be described. Lock ring 51 has a transverse split, not shown, said rounded peripheral tip 50 and a continuous circumferential groove 52, the latter providing a fit between the locking ring and the edge portion 7.

The sealing ring 13 shown is round in sectional contour, but it is to be understood that the section may be changed to any shape found satisfactory, as for example, wedge shape, U shape or the like. However, the cross-sectional area of the sealing ring must bear a definite relation to the sectional area of chamber 53, defined by base 3, flange 8, and locking ring 51, which chamber the sealing ring occupies in service. The total volume of rubber in the sealing ring is preferably equal to the volume of chamber 53 although it will function properly if the volume of the ring is slightly more or less than the volume of chamber 53. Since rubber is non-compressible for practical purposes, it is desirable that the sealing ring be distorted, but does not block the movement of ring 8 from contact with lock ring 51.

The rim base 3 has an oblong valve hole 15. It is to be understood, however, that the valve hole 15 may be multi-sided such as square, hexagonal, triangular, etc., without departing from the present invention. The valve stem, referred to generally as 20, comprises an angular stem portion 21 having end portion 22 with both external and internal threads to receive a valve core 23 and valve cap 24, it being understood that the valve core and cap may be of any type found satisfactory such as those now in common use. The opposite end of valve stem 20 terminates in a head portion 25 (see Fig. 1) having a marginal flange 26, which flange is adapted to contact the lateral inner surface of the rim base about valve hole 15. Said head portion terminates in an end portion 27 which is adapted to enter and snugly fit into valve hole 15, portion 27 being of complementary shape to the shape of said valve hole. Head portion 25 is provided with an internally threaded recess 28 adapted to receive in threaded relation a base portion in the form of a nut 29. Nut 29 is provided with an externally threaded portion 30 adapted to enter threaded recess 28 in threaded relation therewith and flange portion 31 which extends radially outwardly a distance sufficient to overlie the rim about the edges of opening 15. Nut or base 29 is further provided with a wrench socket 32, whereby the nut is threaded into recess 28 and tightened against a sealing washer 33 which is disposed between said flange 31 and the rim base 3, whereby an air tight seal is provided about valve hole 15. Socket 32 communicates with a passage 40 through the central portion of said base or nut. Passage 40 is adapted to align and communicate with a central passage 41 through the stem 20.

The assembly 10 is made by first inserting portion 27 of valve 20 into valve hole 15 of the rim 11, after which the thread portion 30 of nut 29, with the washer 33 disposed about the threaded portion 30, is run down on its threaded portion into recess 28 and firmly tightened by means of a wrench in opening 32, whereby the washer is tightly compressed between flange 31 and the rim base. It is to be understood that the washer may be of rubber or rubber-like material or of any other material found satisfactory. With the stem 20 and rim 11 assembled as just described, a tubeless tire (not shown) is mounted upon the rim and is inflated through valve stem 20 by removing cap 24 and attaching an air chuck, connected to inflationary air source, to the threaded end of the valve stem in the usual manner of inflating tires.

Valve hole 15, whether oblong or of other shape, is so disposed relative to the rim 11, and the complementary shape of valve stem portion 27 is so disposed relative to the angular stem 21 that in the assembly 10, said valve angular stem portion extends substantially axially of the rim.

It will now be seen that, due to the non-round shape of valve stem portion 27 fitting into a complementarily shaped valve hole 15, that in service, it is impossible to turn said valve stem in the valve hole. It will also be seen that, in the event the valve stem becomes injured or for any reason it is desired to remove it from the assembly, it will be a simple matter to demount the tire, remove nut and washer 29 and 33 respectively, by means of a suitable wrench inserted in socket 32. Removal of nut 29 frees the stem portion 21 from the assembly.

The detailed description of the particular embodiment of the invention illustrated herein is not to be construed as limiting the invention thereto. The invention includes all features of patentable novelty residing in the foregoing description and the accompanying drawing.

What is claimed is:

1. A valve stem of the character described adapted to be removably attached to a tubeless tire rim for induction of inflationary fluid through the rim into a tubeless tire, said stem being formed of a barrel portion and a base portion, said barrel portion having a passageway therethrough and terminating at one end in a head portion having a threaded axially extending recess adapted to project into a valve stem hole in said rim, said base being in the general form of a cap screw and being adapted to be threaded into said recess of the end of the barrel portion projected into said valve stem hole.

2. A tire rim and valve stem assembly adapted for use with a tubeless tire, said rim having an oblong valve stem hole through its base portion, said stem having a barrel portion which terminates at one end in a head portion projected and fitted into said valve hole, said head portion having a flange extending beyond the edge of said valve hole and contacting the radial inner surface of said rim, said head having a thread recess opening radially outwardly of the rim, a stem base member in the form of a hollow cap screw having a head flange which overlies the radial outer surface of the rim base about said valve hole, said cap screw being in threaded relation with said recess, a sealing washer between said cap screw flange and the rim, said barrel head portion projected into said oblong valve stem hole being of complementary oblong shape to the valve hole, said cap screw being in tightened threaded relation with said barrel portion whereby said stem is removably retained in said assembly in non-rotatable relation with said rim, and said washer forms an airtight seal between the valve stem and the rim at said valve stem hole.

3. A tire rim and valve stem assembly adapted for use with a tubeless tire, said rim having a multi-sided valve stem hole through its base portion, said stem having a hollow barrel portion which terminates at one end in a head portion having a cross-sectional shape complementary to the shape of said valve hole and being projected and fitted into said valve hole, said head portion having a flange extending beyond the edge of said valve hole and contacting the radial inner surface of said rim, said head having a thread recess opening radially outwardly of the rim, a stem base member in the form of a hollow cap screw having a head flange which overlies the radial outer surface of the rim base about said rim valve hole, said cap screw being in threaded relation with said recess, a sealing washer between said cap screw flange and said rim, said barrel head portion being projected into said multi-sided valve stem hole, said cap screw being in tightened threaded relation with said barrel portion whereby said stem is removably retained in said assembly in non-rotatable relation with said rim, and said washer is squeezed and forms an airtight seal between the valve stem and the rim at said valve stem hole.

References Cited in the file of this patent

UNITED STATES PATENTS

| Number | Name | Date |
|---|---|---|
| 1,072,208 | Dahl | Sept. 2, 1913 |
| 2,563,787 | Keefe | Aug. 7, 1951 |